United States Patent [19]

Masafumi et al.

[11] Patent Number: 4,581,650
[45] Date of Patent: Apr. 8, 1986

[54] SOLID STATE IMAGE SENSOR ARRANGEMENT

[75] Inventors: Inuiya Masafumi; Masahiro Konishi, both of Kaisei, Japan

[73] Assignee: Fuji Photo Film Co., Ltd., Kanagawa, Japan

[21] Appl. No.: 597,722

[22] Filed: Apr. 6, 1984

[30] Foreign Application Priority Data

Apr. 8, 1983 [JP] Japan .................. 58-60830

[51] Int. Cl.$^4$ ............................................. H04N 3/14
[52] U.S. Cl. .................................................. 358/212
[58] Field of Search .............. 358/213, 150, 148, 212; 250/578; 357/24 LR

[56] References Cited

U.S. PATENT DOCUMENTS 3,622,697 11/1971 Metzger ........................ 358/213

Primary Examiner—Gene Z. Rubinson
Assistant Examiner—Stephen Brinich
Attorney, Agent, or Firm—Birch, Stewart, Kolasch & Birch

[57] ABSTRACT

A solid state image sensor system includes an array of image pickup cells, a signal read-out circuit for reading out image signals from the cells, and a shift register circuit for enabling the read-out circuit to produce effective video signals in response to shift pulses shifted through the respective shift register stages. The image sensor circuit includes a function security circuit whereby a shift pulse may be positively shifted through the shift register stages at all times for reading out one image pickup cell at one time.

7 Claims, 19 Drawing Figures

Fig. 2A  CLOCK φH1

Fig. 2B  CLOCK φH2

Fig. 2C  INPUT 130 TO SHIFT REG. 116

Fig. 2D  #1 STAGE OUTPUT FROM SHIFT REG. 116

Fig. 2E  #2 STAGE OUTPUT FROM SHIFT REG. 116

Fig. 2F  #384 STAGE OUTPUT FROM SHIFT REG. 116

Fig. 2G  OUTPUT 118 FROM SHIFT REG. 116

→ TIME

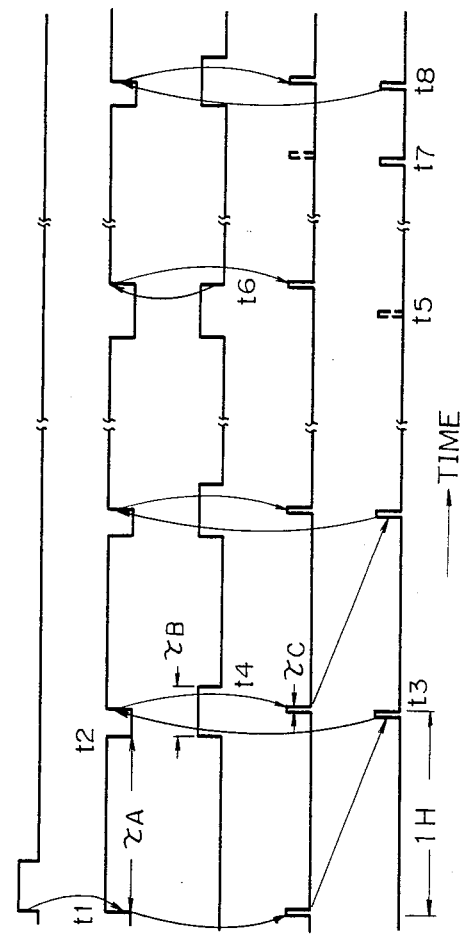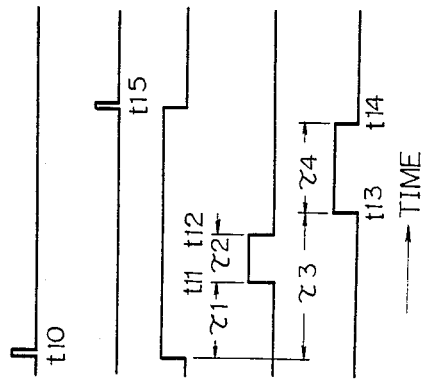
Fig. 3A CONTACT 232
Fig. 3B OUTPUT FROM ONE-SHOT 202
Fig. 3C OUTPUT FROM ONE-SHOT 204
Fig. 3D OUTPUT FROM ONE-SHOT 206
Fig. 3E OUTPUT FROM SHIFT REG. 116
Fig. 5A #385 STAGE OUTPUT 310 FROM SHIFT REG. 116H
Fig. 5B LAST STAGE OUTPUT 118H FROM SHIFT REG. 116H
Fig. 5C HORIZ. BLANK. PULSE HBK
Fig. 5D CLAMP PULSE CLP
Fig. 5E HORIZ. SYNC. PULSE HSYN

SOLID STATE IMAGE SENSOR ARRANGEMENT

BACKGROUND OF THE INVENTION

1. Field of the Invention

This invention relates to a solid state image sensor arrangement, and more particularly to a solid state image sensor arrangement in which a solid state image pickup device is driven in response to clock signals for producing effective video signals in a raster scanning fashion.

2. Description of the Prior Art

In a known manner, there are problems proper to solid state image pickup devices, that is, noises of fixed pattern generated in the devices, and noises of synchronous nature produced in the exterior driving circuits. While the solution to the former problem has been suggested in many ways in the prior art, the latter problem is more intricate and can be met only by practical circuit designing.

In the prior art driving circuit for solid state image pickup devices, the maximum required frequency, such as the original frequency of 14.318 MHz, is divided for producing various driving clocks, sync signals or other control signals for formation of picture or image signals. Such frequency division is effected during the periods other than the blanking periods, that is, during video signal periods as well. The result is that excess pulse current flows in the frequency dividing circuits or the logic circuits connected thereto especially during the time a number of counters are incremented synchronously, these pulses mixing into picture signals through various routes. This initiates periodic noises, deteriorating the quality of the reproduced image.

Since these periodic noises are not to be dealt with sufficiently by resorting simply to practical circuit designing, it is proposed to halt the frequency divider during the effective image period and to drive the divider only during blanking period by a driving circuit ("Drive Pulse Producing Circuit for Solid State Camera Devoid of Sync Noises", by Sato et al. Television Association of Japan, 1981, Report for National Congress, pages 103 to 104). However, this drive circuit is complicated due to provision of countercontrol circuits for stopping the frequency division during the effective image scanning period.

In consideration that the sync noise is derived from the frequency dividing circuit, it has also been suggested to replace the frequency dividing circuit by a ring counter making use of the shift register circuit designed to recycle during one horizontal scanning (1H) period, with various signals being derived by means of decoders from the outputs of plural counter stages corresponding to the blanking period ("Novel Sync Circuit for Solid State Color Camera", by Nishizawa et al. Television Association of Japan, 1982, Report for National Congress, pages 91 to 92).

The latter circuit can be connected naturally to a MOS type image sensor so as to be used as driving circuit for driving the MOS type image sensor. A shift register circuit corresponding to the effective image scanning period is annexed to the MOS type image sensor for driving the read-out circuit. Therefore, when the latter circuit is connected to the MOS type image sensor, at least register stages corresponding to the effective image period are used in redundancy, resulting in a costly and complex circuit.

Moreover, in implementing the driving circuit, it is necessary to monitor and compensate for errors caused during pulse cycling so as to enhance circuit reliability. For example, a circuit need be provided for sensing all zero or plural pulses. However, even granting that such sensing circuit results in prevention of malfunction of the driving circuit, it is not sufficiently effective to assure a foolproof pulse driving in the shift register adapted for driving the read-out circuit of the MOS type image sensor. Thus it is not possible with the aforementioned driving circuit to directly monitor and compensate for read-out error from the MOS type image sensor, despite provision of the sensing circuit.

SUMMARY OF THE INVENTION

It is a principal object of the present invention to provide a solid state image sensor arrangement which is free of the aforementioned deficiency of the prior art and by means of which high quality video signals may be obtained by a relatively simple circuit configuration.

It is another object of the present invention to provide a solid state image sensor arrangement free of sync noises or malfunctions and simpler in structure.

The solid state image sensor of the present invention comprises an array formed by a plurality of image pickup cells, a circuit for reading out video signals from said pickup cells, and a shift register circuit associated with said read-out circuit and consisting of a plurality of register stages, said read-out circuit being sequentially energized by shift pulses being shifted through the shift register circuit in such a manner that effective video signals associated with raster scanning are produced from said read-out circuit, wherein, according to the feature of the invention, there is provided a control circuit in response to which a pulse output is, after being shifted through and produced from said shift register circuit, introduced to a pulse input terminal of said shift register circuit for recycling via delay circuit which causes a delay corresponding to the blanking period.

BRIEF DESCRIPTION OF THE DRAWINGS

The other objects and features of the present invention will become more apparent from a consideration of the following detailed description taken in conjunction with the accompanying drawings in which:

FIGS. 2A–2G and 3A–3E show signal waveforms appearing in various portions of the arrangement shown in FIG. 1;

FIGS. 5A–5E show signal waveforms appearing in various portions of the arrangement shown in FIG. 4.

DESCRIPTION OF THE PREFERRED EMBODIMENTS

In the accompanying drawings, there are shown certain preferred embodiments of the solid-state image sensor arrangement according to the present invention.

Figure 1:
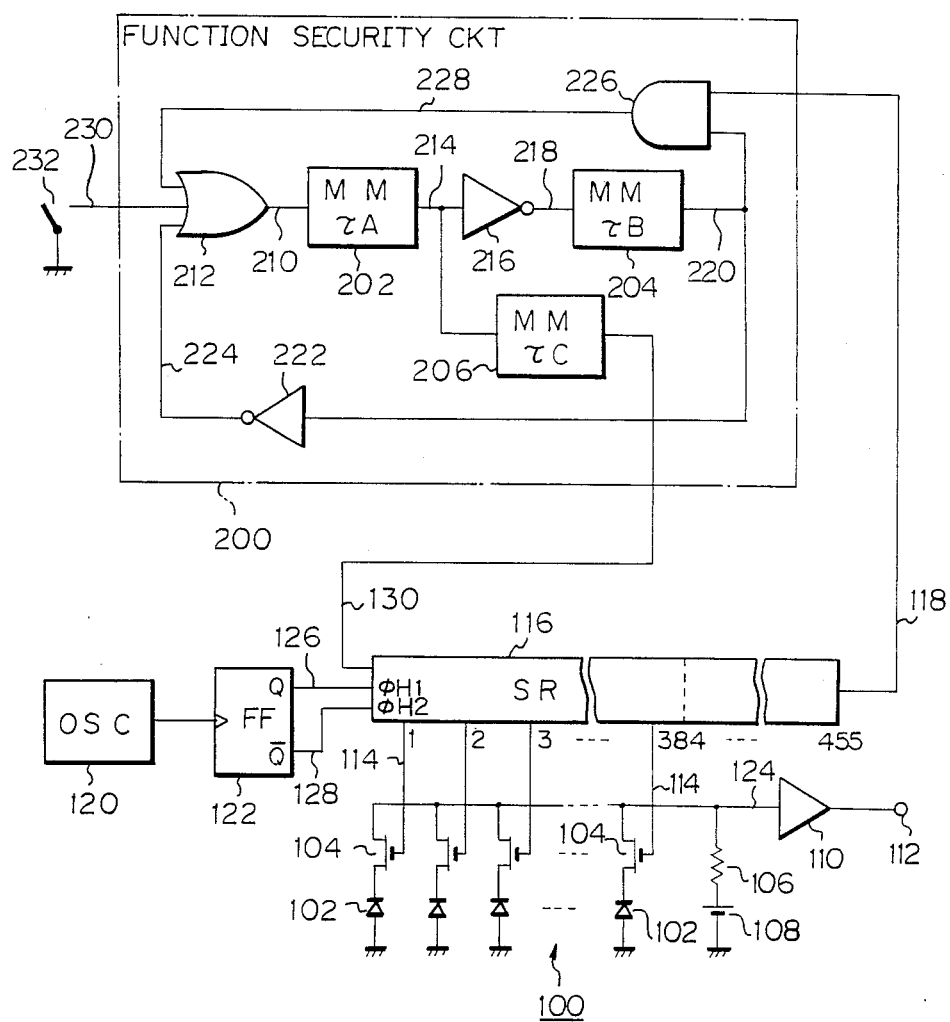
FIG. 1 is a schematic block diagram showing an embodiment of the solid state image sensor arrangement according to the present invention.

Referring to FIG. 1, a line sensor 100 has a one-dimensional array of a large number of, herein 384, image pickup cells 102 such as photodiodes. Each cell 102 is connected to a common signal read-out line 124 through a source-drain passage of a switching MOS transistor 104. The read-out line 124 is connected to a video source 108 via resistor 106 and to an image signal output terminal 112 via a preamplifier 110, for completing an output circuit for image signals.

The gate 114 of each transistor 104 is connected to an associated stage of a shift register (SR) 116. In the present embodiment, shift register 116 has 455 register stages associated with one horizontal scanning (1H) period, of which 384 consecutive stages are used for driving the transistors 104 and the remaining 71 stages act as delay circuit, with signals passing through these stages to no purpose. The last stage is connected via an output line 118 through a function security circuit 200 to an input 130 of the shift register 116 for completing a control circuit. Thus the consecutive 384 stages correspond to the effective image pickup period during the 1H period and the remaining 71 to the blanking period. It is to be noted that the shift register 116 is a cyclic shift register and the above described sequence of the shift register stages allotted to the effective image-pickup period and the blanking period is not limitative of the present invention.

As shown in FIGS. 2A and 2B, shift register 116 is driven by clock signals $\phi H1$ and $\phi H2$ that are in phase opposition to each other. These clock signals are supplied from a flip-flop 122 driven by clock signals supplied from an oscillator (OSC) 120. In the present embodiment, the oscillation frequency of the oscillator 120 is 14.318 MHz.

A single pulse, that is, a true signal "1" is shifted through shift register 116 under control of the control circuit 200. The control or function security circuit 200 has three one-shot or monostable multivibrators (MM) 202, 204, 206. These one-shots are of the type in which retriggering does not occur during the time period corresponding to their time constants $\tau A$, $\tau B$ and $\tau C$. The time constant $\tau A$ is set to be slightly shorter than the 1H period, with account taken of fluctuations which may be caused for instance by changes in ambient temperature, whereas the time constant $\tau B$ is so selected that $\tau A + \tau B$ is slightly longer than the 1H period, with due account taken of fluctuations caused for example by changes in ambient temperature. The time constant $\tau C$ may be set to be equal to the shift pulse width associated with one stage of the shift register 116.

The monostable multivibrator 202 has its input 210 connected to an output of a three-input OR-gate 212 and its output 214 connected to an input 218 of the monostable multivibrator 204 through an inverter 216 and to the monostable multivibrator 206, the output of which is connected to the input 130 of shift register 118.

The monostable multvibrator 204 has its output 220 connected to one input 224 of the OR gate 212 through an inverter 222 and to one input of a two-input AND gate 226. To the other input of the AND gate 226 is connected the aforementioned output 118 of the shift register 116. The AND gate 226 has its output 228 connected to the other terminal of the OR gate 212, the other input 230 of which is grounded through a make-contact 232, which is a normally open contact and closed transiently when the power switch of the present unit is turned on.

The operation of the present embodiment is described by referring to the time charts of FIGS. 2A–2G and 3A–3E. When the power switch of the unit is turned on (at time t1) the contact 232 is closed transiently, FIG. 3A. This sets the output 214 of the multivibrator 202 to a high level for a time period $\tau A$, FIG. 3B, thus setting the output 130 of the monostable multivibrator 206 to a high level during a time period $\tau C$, FIG. 3D. The high-level output pulse from multivibrator 206 is supplied through output lead 130 to the shift register 116, FIG. 2C, to cause the first stage output 114 to enable the gate of a first-stage transistor 104, FIG. 2D. This causes the image signal of the pickup cell 102 to be read out through a source-drain passage of transistor 104 to a signal line 124 and supplied at output 112 through a preamplifier 110.

Clock signals $\phi H1$, $\phi H2$ are supplied to clock inputs 126, 128 of shift register 116, respectively. Thus the pulse supplied via output lead 130 is shifted stepwise through the respective stages of the shift register 116 responsive to these clock signals, FIG. 2E. This renders the transistors conductive in succession so that the image signals of the pickup cells 102 are read out in succession at the output terminal 112.

When the pulse has been shifted to the 384th stage of the shift register 116, FIG. 2F, the image signal associated with one horizontal scanning line has been read out. This terminates the picture period. However, the shift register 116 continues its operation until the pulse is shifted to the final or 455th stage at which time a pulse is issued at output 118, FIG. 2G and FIG. 3E at time t3. These 71 stages from the 385th to the 455th stage correspond to the horizontal blanking period.

It should be noted that, since the time constant $\tau A$ of the monostable multivibrator 202 is set to be shorter than the 1H period, the output 214 thereof is deactivated before the end of the 1H period, so that the monovibration 204 is activated, at time t2, FIG. 3. The time constant $\tau B$ of the monostable multivibrator 204 is so set than the sum of time constants $\tau B$ and $\tau A$ exceeds the 1H period, as mentioned hereinabove. Thus the pulse on output 118 of shift register 116 is produced during the time period $\tau B$ of the monostable multivibrator 204, if the system is operating normally.

During this $\tau B$ period, since the one input of AND gate 226 is activated by monostable multivibrator 204, the pulse issued on the output 118 of the shift register 116 is allowed to pass through this AND gate 226 and the OR gate 212 for reactivating the multivibrator 202. The above described sequence of operations is repeated again for reading out the image signals on the array of pickup cells 202. It should be noted that, after lapse of the time period $\tau B$ at t4, multivibrator 204 is reset and the output thereof is inverted at inverter 222 and transmitted to multivibrator 202 through OR gate 2. However, this is not effective to renew the period $\tau A$ during which the output of the monostable multivibrator 202 is at a high level, because the monovibrator 202 is of the untriggerable type, as mentioned above.

If, for some reason, no pulse is supplied at output 118 from shift register 116 during the period of time constant $\tau B$ of the monostable multivibrator 204 as shown at t5 in FIG. 3E, the output 220 of monostable multivibrator 204 falls upon termination of the period $\tau B$ (time t6) thus enabling the monostable multivibrator 202. This enables the monostable multivibrator 206 so that the pulse is introduced to the input 130 of shift register 116 to effect the read-out of the pickup cell array.

If, by some reason or other, an output is supplied from the output 118 of the shift register 116 during the time period other than the time period $\tau B$, as at time t7, there is no enable signal at the other input of the AND gate 226, so that the pulse is inhibited from passing through the AND gate and unable to change the circuit state. Thus, according to the present invention, only the pulse supplied to the output 118 during the short time interval τB is caused to be introduced into and recycle through shift register 116. Hence, a signal pulse is shifted at all times through the respective stages of the shift register 116 for reading one pickup cell 102 at a time.

In the above description, the 1st to 384th stages of the shift register 116 for driving the read-out transistors 104 and the 385th to 455th stages for providing a delay corresponding to the blanking period are formed on one and the same substrate. However, these sets of stages may be separated from one another. It is sufficient if a control circuit, in which a pulse output transmitted stepwise through the shift register circuit for driving the read-out circuit, is caused to be introduced into the pulse input terminal of the shift register for recycling therethrough via a delay circuit adapted to cause a delay corresponding to the blanking period. Thus, any circuit driven by the same clock signals may be used in place of the aforementioned shift register circuit for providing the delay corresponding to the blanking period.

Figure 4:
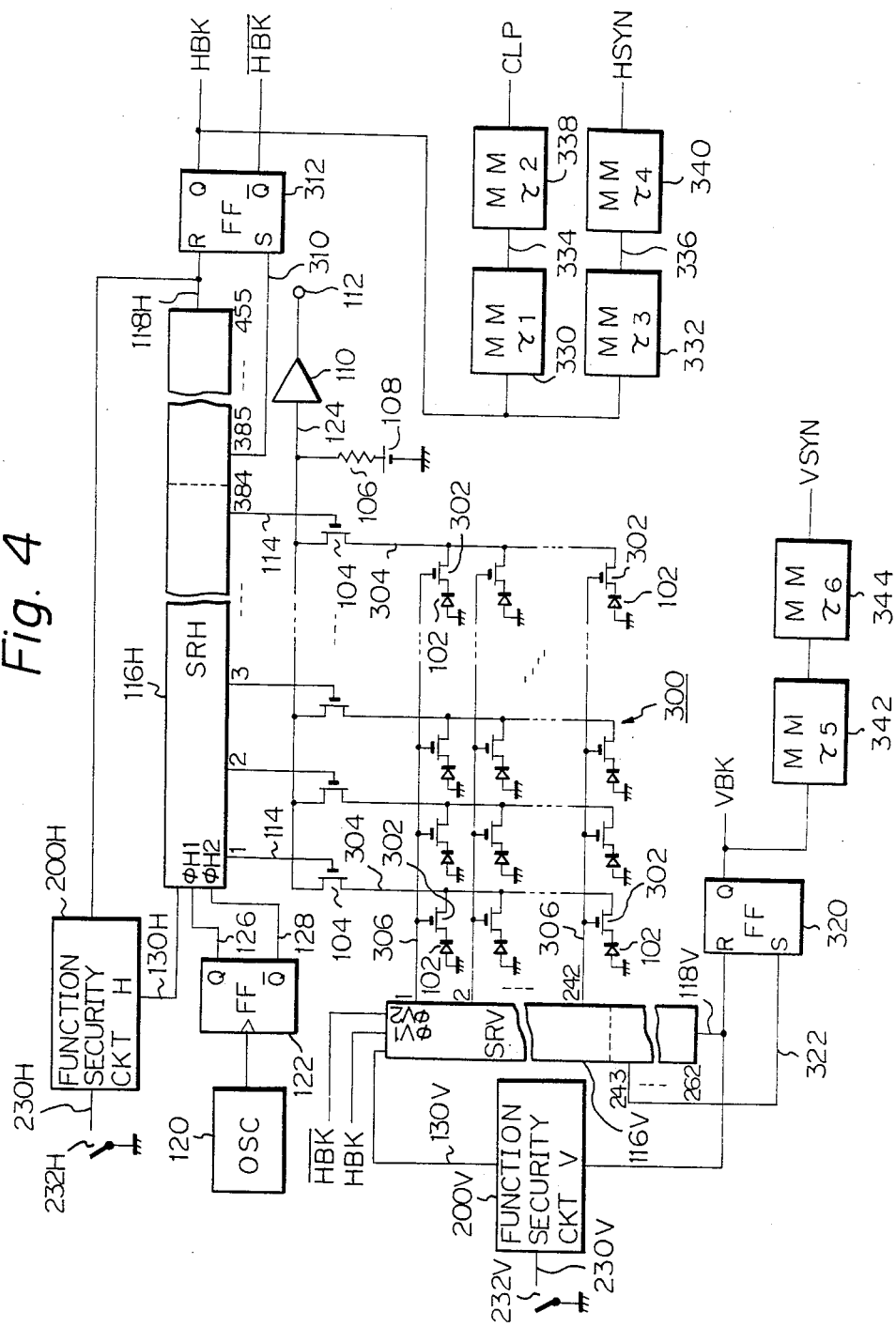
FIG. 4 is a schematic block diagram showing a modified embodiment of the solid state image sensor arrangement according to the present invention.

Referring to FIG. 4, there is shown a modified embodiment of the present invention including a two-dimensional image sensor 300. In the present embodiment, the image sensor 300 is a two-dimensional array of 242 horizontal rows and 384 vertical columns of image pickup cells 102. It is to be noted that such an array of elements is merely illustrative and may be replaced by a two-dimensional array consisting of, for example, 910 horizontal rows and 525 vertical columns of picture elements or pixels. In FIG. 4, the same parts as those used in the embodiment of FIG. 1 are depicted by the same numerals. In addition, any parts or elements used in connection with horizontal scanning are occasionally denoted by corresponding numerals with suffix letter H, whereas parts or elements used in conjunction with vertical scanning are similarly designated by the corresponding numerals with suffix letters V.

Each image pickup cell 102 of a vertical column is connected via a source to drain passage of an associated switching MOS transistor 302 to a vertical read-out line 304, which is connected to a transistor 104. Each transistor 302 of a horizontal row is connected via horizontal row selection line 306 to a stage of a vertical scanning shift register 116V.

A shift register 116H for horizontal scanning is similar in construction to the shift register 116 shown in FIG. 1. However, an output 310 is derived from its 385th stage and connected to a set input S of a flip-flop 312, and another output 118H derived from the 455th stage is connected to a horizontal control circuit 200H and to a reset input R of a flip-flop 312. A function security circuit 200H is same as function security circuit 200 shown in FIG. 1.

A shift register 116V for vertical scanning may be similar in structure to shift register 116H. However, in the present embodiment, the number of stages of the shift register 116V is 262 for matching with a vertical scanning or one field (1V) period. Of these, 242 consecutive stages are connected respectively to associated ones of horizontal row selecting lines 306 and represent an effective vertical scanning or pickup period. The remaining 243rd to 262nd stages represent a vertical blanking period during which shift pulses are shifted to no purpose. An output 118V is derived from the last stage and connected to a control circuit 200V and to a reset input R of a flip-flop 320. An output 322 derived from the 243rd stage is connected to a set input S of flip-flop 320.

These shift registers 116H, 116V may be divided into two groups, that is, a first group of register stages for driving the read-out circuit and a second group of register stages for effecting a delay corresponding to the blanking period, as mentioned hereinabove. In addition, the latter group of register stages may be replaced obviously by delay circuits other than shift register for achieving similar results.

The function security circuit 200V associated with vertical scanning is similar in construction to the security circuit 200H associated with horizontal scanning, with the exception of time constants of the monostable multivibrators 202, 204. Thus the time constant τA is selected to be slightly shorter than 1V period while τB is selected in such a condition that the sum τA+τB is longer than the 1V period, with such factors as change of temperature duly taken into account. In this manner, a single pulse may be caused to cycle through the vertical shift register 116V at all times as in the case of the horizontal shift register 116H.

The function security circuit 200V has its input 230V grounded through a contact 232V similar to contact 232H. These contacts 232H, 232V are activated simultaneously when the power switch of the present unit is turned on. These contacts may naturally be combined into a single common contact.

An output 130V of the function security circuit 200V is connected to a pulse input of the vertical shift register 116V, while a Q output HBK and a $\overline{Q}$ output $\overline{HBK}$ of flip-flop 312 are connected to clock inputs φV1, φV2 of the register 116V respectively. Clock inputs φV1, φV2 are comparable and operate similarly to clock inputs φH1, φH2 of the horizontal shift register 116H.

The Q output HBK of flip-flop 312 is also connected to monostable multivibrators 330, 332, the outputs 334, 336 of which are connected respectively to monostable multivibrators 338, 340.

As regards horizontal scanning, the circuit of FIG. 4 is basically the same as the circuit of FIG. 1. As regards vertical scanning, when the power switch is turned on, a high level signal is coupled to the first stage of the vertical shift register 116V by function security circuit 200V, as in the case of horizontal scanning. The vertical shift register 116V operates for data shifting responsive to the output from flip-flop 320, in such a condition that a vertical selection line 306 is driven during the 1H period. This enables the switching transistors 302 of the horizontal row in unison. During this time interval, the horizontal selection lines 114 are sequentially selected for energizing the switching transistors 104 in succession. In this manner, picture signals are read out sequentially from the respective pickup cells 102 of the horizontal row to the output line 112.

As the driving of the horizontal selection line 114 for the 384th stage is terminated, shift pulse is shifted to the 385th stage, its high level output 310 setting the flip-flop 312, FIG. 5A, time t10. This sets the horizontal blanking pulse HBK to high level, FIG. 5C, thus activating monostable multivibrators 330, 332. These multivibrators are activated in effect after delay periods equal to their time constants τ1, τ3, respectively, as shown in FIGS. 5D, 5E, so that a clamp pulse CLP with a duration equal to the time constant τ2 of multivibrator 338 and a horizontal sync pulse HSYN with a duration equal to time constant τ4 of multivibrator 340 are produced, as similarly shown in FIG. 5D and FIG. 5E. A signal forming circuit is made up of these monostable multivibrators and flip-flops for producing various control signals necessary for formation of picture signals.

During this time interval, shift pulse is shifted from the 385th to the last stage of the shift register 116H and, as the pulse reaches the last stage, a pulse is supplied to the output line 118H, FIG. 5B, at time t15. This time interval represents a horizontal blanking period. Flip-flop 312 is reset by this high level output 118H so that a horizontal blanking pulse HBK is produced, as shown in FIG. 5C.

The horizontal blanking pulse HBK is also used as driving clock signal for vertical shift register 116V so that shift register 116V shifts the pulse to the next stage in response thereto for performing a similar read-out operation for the next horizontal row.

In this manner, the read-out operation is effected up to the 242nd stage of the vertical shift register 116V and the shift pulse then shifts to the 243rd stage. This causes a high level at the output line 322 of the 243rd stage for thereby setting the flip-flop 320. The Q output of flip-flop 320 is now at high level thus setting a vertical blanking pulse VBK to a high level.

The cyclic shifting operation of the horizontal shift register 116H is continued during the vertical blanking period, in such a condition that shift clock pulses are supplied to the vertical shift register 116V through flip-flop 312. Thus the shift pulse is shifted from the 243rd to the last stage of the vertical shift register 116V. When the pulse reaches the last stage, flip-flop 320 is reset, so that the Q output of flip-flop 320 is at a low level. With a vertical blanking pulse thus issued, one-field raster scanning is now completed. In FIG. 4, 342, 344 denote monostable multivibrators for producing vertical sync pulse VSYN after a time delay equal to their time constants τ5, τ6 is caused to the vertical blanking pulse.

The time constants of the monostable multivibrators used in the image sensor are so selected that an output pulse is issued from the output of the vertical shift register 116V upon termination of the 1V period and during the time interval of time constant τB of the monostable multivibrator 204 of the operation security circuit 200V. The result is that a single pulse is cycled at all times through the vertical shift register 116V as in the case of the horizontal shift register 116H.

According to the present invention, the drive pulse is cycled by a cyclic control circuit making use of the shift register adapted for driving the read-out circuit, thus simplifying the drive circuit. In addition, various control signals necessary for processing the picture signals are derived from the shift register adapted for scanning or driving the image sensor, so that a single oscillator with a single frequency suffices. Above all, in the case of a two-dimensional image sensor, there is no necessity of using specified frequency dividers.

In addition, in the event that the control circuit of the present invention is provided with a function security circuit, the shift pulse used for driving the image sensor can be controlled directly by the operation security circuit, thereby further improving the operational reliability of the image sensor.

In this manner, high quality picture signals can be obtained by the solid state image sensor of the present invention which is simple in circuit construction and which is free of synchronous noises or malfunction.

While there have been described and shown above illustrative embodiments of the present invention, it will be appreciated that the invention is not restricted thereto. Accordingly, all variations, modifications and equivalent arrangements within the scope of the attached claims should be considered within the scope of the invention.

What is claimed is:

1. A solid state image sensor system comprising:
    a photosensitive array including a plurality of image pickup cells producing video signals;
    read-out means for reading out the video signals from said pickup cells;
    a shift register circuit associated with said reading out means and consisting of a plurality of register stages, said circuit being sequentially energized by a shift pulse shifted through said shift register circuit such that effective video signals developed by raster scanning are produced from said read-out means;
    delay means for delaying signals provided thereto in association with the blanking period of the raster scanning; and
    control means for introducing a pulse output, after the shift pulse is shifted through said shift register circuit to a pulse input terminal of said shift register circuit for recycling via said delay means;
    said control means comprising function security means for monitoring a first time interval commencing at the time a pulse is introduced to an input terminal of said shift register circuit, and a second time interval longer than the first time interval;
    said control means permitting a pulse to be introduced to an input terminal of said shift register circuit when the pulse is supplied thereto after lapse of the first time interval and before lapse of the second time interval, inhibiting the pulse from being introduced to the input terminal when the pulse is supplied to said function security means before lapse of the first time interval, and permitting the pulse to be introduced to the input terminal synchronously with lapse of the second time interval when said pulse is not supplied until lapse of the second time interval.

2. An arrangement in accordance with claim 1, wherein said control means comprises signal generating means for producing control signals necessary for producing image signals from the output of said delay means.

3. An arrangement in accordance with claim 2, wherein said control signals include at least one signal selected from the group consisting of a sync signal, a blanking signal and a clamp signal.

4. An arrangement in accordance with claim 1, wherein said delay means comprises a second shift register formed by a plurality of register stages connected to the last stage of said shift register circuit.

5. An arrangement in accordance with claim 1, wherein
    said array is a two-dimensional array forming plural horizontal rows and vertical columns of image pick-up cells;
    said read-out means comprises first switching means for selecting said pickup cells by horizontal rows thereof, and second switching means for reading out video signals from the image pickup cells selected by said first switching means;
    said shift register circuit comprises a vertical shift register circuit for sequentially enabling said first switching means and a horizontal shift register circuit for sequentially enabling said second switching means;

said vertical shift register circuit shifts said pulse responsive to output from said horizontal shift register circuit;

said control means further comprises a horizontal control circuit wherein the pulse output shifted through said horizontal shift register circuit is introduced to the pulse input terminal of said horizontal shift register circuit for recycling therethrough by way of a horizontal delay circuit causing a delay substantially equal to the horizontal blanking period of the raster scanning, and a vertical control circuit wherein the pulse output cycled through said vertical shift register circuit is introduced to the pulse input terminal of said vertical shift register circuit for recycling therethrough by way of a vertical delay circuit causing the delay substantially equal to the vertical blanking period of the raster scanning.

6. An arrangement in accordance with claim 5, wherein said horizontal control circuit comprises a signal forming circuit for forming control signals necessary to form video signals from the output of the delay circuit thereof, said signal forming circuit forming at least one pulse selected from the group consisting of a horizontal blanking pulse, a clamp pulse and a vertical shift register driving clock pulse.

7. An arrangement in accordance with claim 5, wherein said vertical control circuit comprises a signal forming circuit to form control signals necessary for forming video signals from the output of the delay circuit thereof, said signal forming circuit forming at least a vertical sync pulse or a vertical blanking pulse.

* * * * *